(12) United States Patent  (10) Patent No.: US 11,948,208 B1
Ryan et al.  (45) Date of Patent: Apr. 2, 2024

(54) VARIABLE GRAPHICAL REPRESENTATIONS BASED UPON GRAPH-NODE DISTANCE

(71) Applicant: Microsoft Technology Licensing, LLC, Redmond, WA (US)

(72) Inventors: Emma Ryan, Seattle, WA (US); Sandeep Siddhartha, Kirkland, WA (US); Jatin Patel, Redmond, WA (US); Timothy M. Cleary, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/099,047

(22) Filed: Jan. 19, 2023

(51) Int. Cl.
*H04L 29/08* (2006.01)
*G06Q 50/00* (2012.01)
*G06T 13/40* (2011.01)

(52) U.S. Cl.
CPC ............. *G06Q 50/01* (2013.01); *G06T 13/40* (2013.01)

(58) Field of Classification Search
CPC ................................ G06Q 50/01; G06T 13/40
See application file for complete search history.

(56) References Cited

U.S. PATENT DOCUMENTS

| 9,872,074 | B1 | 1/2018 | Eliseo et al. |
| 10,684,738 | B1 * | 6/2020 | Sicora .................. G06F 16/435 |
| 11,335,169 | B1 | 5/2022 | Meadows et al. |
| 2011/0279639 | A1 | 11/2011 | Anand et al. |
| 2012/0094737 | A1 | 4/2012 | Barclay et al. |
| 2013/0215112 | A1 | 8/2013 | Ho et al. |
| 2014/0214945 | A1 * | 7/2014 | Zhang .................. H04L 67/306 709/204 |
| 2015/0290540 | A1 | 10/2015 | Trombetta et al. |
| 2015/0297997 | A1 | 10/2015 | Mccoy et al. |
| 2016/0067617 | A1 | 3/2016 | Tolk et al. |

(Continued)

FOREIGN PATENT DOCUMENTS

EP     2860686 A1     4/2015

OTHER PUBLICATIONS

"AI and Machine Learning for Games", Retrieved From: https://aws.amazon.com/gametech/ai-machine-learning/, Aug. 16, 2022, 14 Pages.

(Continued)

*Primary Examiner* — Kim T Nguyen
(74) *Attorney, Agent, or Firm* — Schwegman Lundberg & Woessner, P.A.

(57) ABSTRACT

A system and method for presenting different graphical representations of a user to different end-users in a network-based communication environment are provided. A first end-user has a first a social distance from a user in a social graph while a second end-user has a second social distance from the user that is further than the first social distance in the social graph. A first graphical representation is provided in the network-based communication environment displayed to the first end-user and a second graphical representation different from the first graphical representation is provided in the network-based communication environment displayed to the second end-user. The difference between the first graphical representation and the second graphical representation is based on the difference between the first social distance and the second social distance.

20 Claims, 10 Drawing Sheets

(56) References Cited

U.S. PATENT DOCUMENTS

2018/0129870 A1    5/2018  Bacivarov et al.
2021/0019839 A1*   1/2021  Su ..................... G06F 16/9536
2021/0042960 A1    2/2021  Dassa et al.

OTHER PUBLICATIONS

"Google Cloud for gaming", Retrieved From: https://cloud.google.com/solutions/gaming, Aug. 16, 2022, 4 Pages.

"Introducing Meta Accounts and Meta Horizon Profiles for VR", Retrieved From: https://about.fb.com/news/2022/07/meta-accounts-and-horizon-profiles-for-vr/, Jul. 7, 2022, 9 Pages.

"Meta Connect 2022: Meta Quest Pro, More Social VR and a Look Into the Future", Retrieved From: https://about.fb.com/news/2022/10/meta-quest-pro-social-vr-connect-2022/, Oct. 11, 2022, 12 Pages.

"Testing New Tools for Horizon Worlds Creators To Earn Money", Retrieved From: https://about.fb.com/news/2022/04/testing-creator-monetization-horizon-worlds/, Apr. 11, 2022, 7 Pages.

"What is a video monetization platform?", Retrieved From: https://vlogbox.com/, Aug. 16, 2022, 6 Pages.

Westerlund, Anton, "Using Video Communication in Online Multiplayer Games", In Thesis of Bachelor in Media Technology, Linnaeus University, Apr. 2021, 55 Pages.

\* cited by examiner

VARIABLE GRAPHICAL REPRESENTATIONS BASED UPON GRAPH-NODE DISTANCE

TECHNICAL FIELD

Examples pertain to rending a network-based communication environment. Some examples relate to creating different graphical representations for display in the network-based communication environment.

BACKGROUND

Network-based communication environments allow a user to interact with other users. The users are connected over a network where a network-based communication environment is rendered and the users are immersed into the network-based communication environment. The users can communicate with each other and interact with each other in the network-based communication environment. Moreover, graphical representations of the users are provided in the network-based communication environment, typically in the form of an avatar or a similar graphical representation of the users. Often, users in the network-based communication environment may have a relationship outside of the network-based communication environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
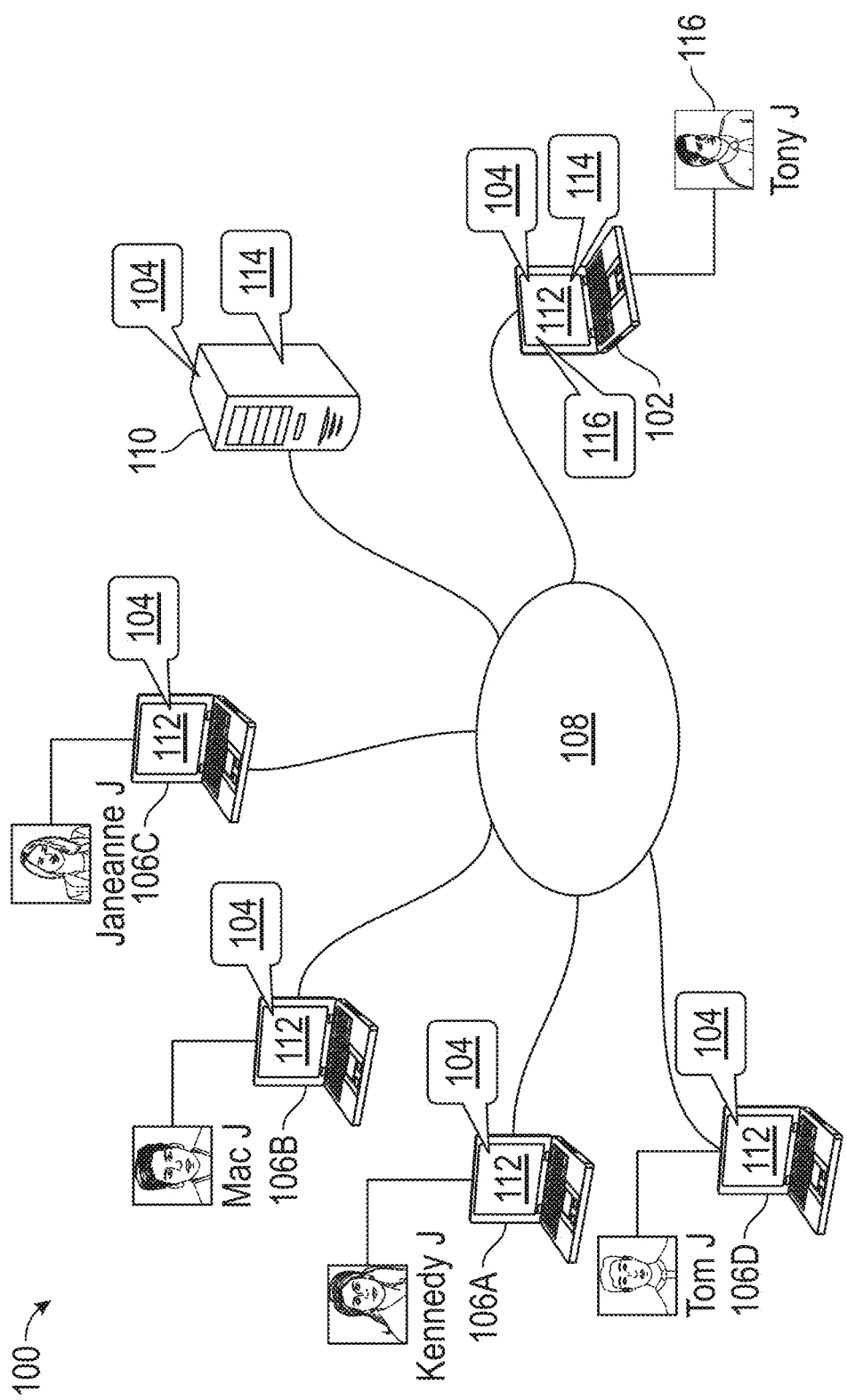
FIG. 1 shows an environment in which examples may operate, according to some examples of the present disclosure.

Typically, graphical representations within the network-based communication environment cannot be adjusted to account for a relationship between users outside of the network-based communication environment. Accordingly, a need exists for a method and system that can render a graphical representation of a user in a network-based communication environment to an end-user in the network-based communication environment based on a relationship between the user and the end-user determined from a social graph.

Examples relate to augmenting views in a network-based communication environment based on a social graph. Different graphical representations of a user are selectively created to display to end users in a network-based communication environment based on the social graph. Thus, the network-based communication environment can be linked to the social graph. The network-based communication environment can be a game and the game can be linked to social media, such as FB and LI. The social graph can have a plurality of social distances between the user and the end users. The social graph can be used to determine what graphical representation for the user should be presented to end-users in the network-based communication environment. A first end-user can have a first graphical representation of the user in the network-based communication environment displayed at a first end-user device. A second end-user can have a second graphical representation of the user in the network-based communication environment displayed at a second end-user device that is different from the first graphical representation. The first graphical representation can be based on a first social distance between the first end-user and the user. The second graphical representation can be based on a second social distance between the second end-user and the user. Here, the first social distance can be different from the second social distance. Moreover, the second graphical representation can be based on the second end-user not being on the social graph. Thus, the first graphical representation can be different from the second graphical representation based on the different social distances or whether or not a user is on the social graph.

The social graph can include a plurality of nodes separated by edges. The plurality of nodes can correspond to the user along with each of the plurality of end-users. The plurality of nodes can be separated by the edges where a social distance between the user and a second user on the social graph corresponds to a shortest path between the user and second user on the social graph where each edge is assigned a particular cost. The cost for a particular edge may be different depending on the relationship between each user. Example relationships include presence of the first and second user in a contact database of the first or second user, a "friend" or "follower" relationship, exchanged messages between the first and second user, and the like. In some examples, the system may change the cost between two nodes (e.g., lower) as additional relationships between the nodes (e.g., users) are established. For example, a first cost between two nodes that are in each other's contact databases may be higher than two nodes that are in each other's contact database and also have indicated that they have a higher order relationship. Examples of higher order relationships can include friends, spouses, siblings, co-workers, and the like.

Many of the examples described herein are provided in the context of a social or business networking website or service. However, the applicability of the inventive subject matter is not limited to a social or business networking service. A social networking service is an online service, platform or site that allows members to build or reflect social networks or social relations among members. Typically, members construct profiles, which may include personal information such as name, contact information, employment information, photographs, personal messages, status information, links to web-related content, blogs, and so on. Typically, only a portion of a members profile may be viewed by the general public, and/or other members.

The social networking site allows members to identify, and establish links or connections with other members in order to build or reflect social networks or social relations among members. For instance, in the context of a business networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation. In some examples, some social networking services operate on a subscription or following basis, where one member follows another without mutual agreement. For example, Twitter, a micro-blogging service allows members to follow other members without explicit permission.

A determination can be made that the first social distance meets a preset threshold condition. The preset threshold condition can be that a single edge separates the user from a given end-user. If the first distance between the user and the first end-user meets the preset threshold, such as only a single edge separates the user from the first end-user in a social graph, the first-end user can be presented with a first graphical representation. The first graphical representation can be a photo or a video image of the user.

For a second social distance, a determination can be made regarding whether or not the second social distance meets the preset threshold condition. More specifically, the second social distance between the user and the second end-user can be greater than one edge, i.e., two, three, four, etc. edges in the social graph separate the user from the second end-user. Thus, a determination can be made that the second social distance does not meet the preset condition of one edge separating the user and the second end-user. Here, the second end-user can be provided with the second graphical representation, which can be different from the first graphical representation. In particular, the second graphical representation can be a curated image, such as an avatar.

The social graph can be a contact list of the user where end-users that are listed on the contact list can have the first graphical representation provided in the network-based communication environment displayed to the end-users listed on the contact list. The listing on the contact list can correspond to a first social distance. For those end-users that are not listed on the contact list, the second graphical representation can be provided in the network-based communication environment displayed to the end-users not listed on the contact list. The second social distance can correspond to the end-user not being listed on the contact list.

While discussion is made regarding a number of edges between nodes in a social graph that are to be used in determining a graphical representation to provide in a network-based communication environment, examples can make use of other methods. To further illustrate, a lowest cost path between nodes exclusive of a number of edges could be used in determining a social distance. A pathfinding algorithm, such as Dijkstra's Algorithm, A* Search, Greedy Best-first Search, or the Swarm Algorithm could be used to determine lowest cost.

Different edges can be assigned different weights based on how often the edge is utilized or the context of how the edge was established. If two edges are used multiple times while a single edge has only been used once, the two edges could be given a higher weight and the single edge could be given a lower weight. Thus, that the shorter social distance can include the combination of two edges and the single edge could be a longer social distance.

Examples address technical problems rooted in computer technology where examples provide technological solutions to technological problems specific to computer networks. A technical problem specifically arising in the realm of computer networks relates to users who are engaged in a computing environment provided by a computer network not having a readily discernable way of knowing about others in the shared computing environment. In particular, a user may not be able to readily determine who other users are in a shared computing environment and whether or not they actually know the other users. Thus, examples are focused on challenges particular to the Internet and computing environments. Examples use components in an unconventional manner in order to improve computer functionality. More specifically, examples utilize technical solutions that correlate relationships between a first user and second and third users with a social graph. Based on the relationships, the disclosed computer architecture alters an image of the first user to provide a first graphical representation that is presented to the second user in a shared computing environment. The disclosed computer architecture also alters an image of the first user to provide a second graphical representation different from the first graphical representation that is presented to the third user in the same computing environment. A technical solution lies in adjusting graphics relating to a first user that are presented to different users, i.e., the second and third users, in the same computing environment based on different relationships the first user has with the different users. As such, computer components operate in an unconventional manner by respectively rendering different graphical representations of a first user to a second user and a third user in the same computing environment based on different relationships the first user has with the different users. Furthermore, examples relate to allowing the second and third user to be able to rapidly access information, i.e., a relationship between the user and other users in a shared computing environment, that is provided in a user interface.

Now making reference to FIG. 1, an environment 100 in which examples may operate is shown. A user 116 associated with a device 102 can execute a network-based communication application, generically shown as 104, which can provide a communication application. The network-based communication application 104 can provide audio and/or video-based collaboration with document sharing, virtual meetings, group meetings, and the like between the device 102 and devices 106A-D via a network 108. The network-based communication application 104 can be based locally on the devices 102 and 106A-DC.

Additionally, a server device 110 can provide the network-based communication application 104 to the devices 102 and 106A-D. In some examples, the server device 110 may assist in routing communications between the devices 102 and 106A-D. An example of the network-based communication application 104 can include Microsoft Teams™.

The devices 102 and 106A-D along with the server device 110 can include any type of computing device, such as a desktop computer, a laptop computer, a tablet computer, a portable media device, or a smart phone. Throughout this document, reference may be made to the device 106 or the devices 106A-D. The term device 106 and the term devices 106A-D are interchangeable with each other.

The network 108 may be any network that enables communication between or among machines, databases, and devices (e.g., the devices 102 and 106A-D). The network 108 can be a packet routing network that can follow the Internet Protocol (IP) and the Transport Control Protocol (TCP). Accordingly, the network 108 can be a wired network, a wireless network (e.g., a mobile or cellular network), or any suitable combination thereof. The network 108 can include one or more portions that constitute a private network, a public network (e.g., the Internet), or any suitable combination thereof.

The devices 102 and 106A-D can each execute a multimedia-based application 112 that is separate from the network-based communication application 104. The multimedia-based application 112 can render a network-based communication environment. The multimedia-based application 112 can be any type of immersive interactive application where multiple users can simultaneously participate and engage with one another in an environment rendered by the multimedia-based application 112. Examples can include a gaming application, a video-conferencing application, a virtual meeting application, a messaging application, electronic mail, an e-commerce application such as an online auctioning application, and the like.

In addition, the server device 110 can include an application 114 that can be an algorithm that can perform the operations discussed herein. To further illustrate, the algorithm of the application 114 can be configured to selectively create different graphical representations of a user to display to end users in a network-based communication environment based on a social graph. A graphical representation can also include an appearance of a user. In some instances, the multimedia-based application 112 and the application 114 can be combined into a single application. Moreover, in some instances, the network-based communication application 104 and the application 114 can be combined into a single application As shown with reference to FIG. 1, user TonyJ can be associated with the device 102 while end-user KennedyJ can be associated with the device 106A and end-user MacJ can be associated with the device 106B. Moreover, end-user JaneanneJ can be associated with the device 106C while end-user TomJ can be associated with the device 106D. In examples, each of the user TonyJ, and end-users KennedyJ, MacJ, JaneanneJ, and TomJ can be part of a social graph 200, as shown with reference to FIG. 2.

The social graph 200 illustrates how the user TonyJ and each of the end-users KennedyJ, MacJ, JaneanneJ, and TomJ are connected with each other. The social graph 200 can show the connections between users in a social networking environment, such as Facebook™, Instagram™, Snapchat™, LinkedIN™, and the like. Each of the user TonyJ and the end-users KennedyJ, MacJ, JaneanneJ, and TomJ along with end-users JuneJ, AlissaR, JimB, and RyanB are associated with nodes 202-218. The user TonyJ is associated with the node 202, the end-user JaneanneJ is associated with the node 204, the end-user TomJ is associated with the node 206, and the end-user JuneJ is associated with the node 208. Furthermore, the end-user AlissaR is associated with the node 210, the end-user KennedyJ is associated with the node 212, and the end-user MacJ is associated with the node 214 while the end-user JimB is associated with the node 216 and the end-user RyanB is associated with the node 218. As used herein, reference to the nodes 202-218 can also be construed as a reference to the user or end-user associated with the node. As such, when reference is made to nodes 202 and 206 and a distance between the nodes 202 and 206, this can refer to a social distance between the user TonyJ and the end-user TomJ.

Each of the nodes 202-218 are separated by edges 219-234. The edges can represent social relationships between each of the users. The edges can relate to a relationship between nodes connected by the edges. A single edge between users can indicate a direct, or first degree, connection and/or relationship between the users at either end of the edge. More specifically, if a single edge separates two nodes, this can correlate to the users represented by the nodes having a direct relationship with each other, i.e., they are connections. If two edges separate two nodes, this can mean that the relationship that exists between the users associated with the nodes is a connection of a connection. Thus, this can be considered a second-degree connection. If three edges separate two nodes, this can mean that the relationship that exists between the users associated with the nodes is a connection of a connection of a connection. This can be considered a third degree connection. Accordingly, the greater number of edges between a first node associated with a user and a second node associated with an end-user, the greater the social distance between the user and the end-user.

The edge 219 separates the nodes 202 and 206. Here, the user TonyJ and the end-user TomJ are connections and have a first degree connection. In a similar manner, only the edge 222 separates the node 202 from the node 216 and only the edge 226 separates the node 202 from the 208. Thus, the user TonyJ and the end-user JimB are direct friends and also have a first degree connection. The user TonyJ and the end-user JuneJ are direct friends and also have a first degree separation.

The edges 219 and 230 separate the node 202 from the node 212, thus the user TonyJ and the end-user KennedyJ have a second degree connection. In particular, the node 206 separates the node 202 and the node 212. Accordingly, the end-user KennedyJ is a friend of a friend (TomJ) of the user TonyJ. Likewise, the edges 226 and 228 separate the node 202 from the node 210. Here, the node 208 separates the node 202 and the node 210. Thus, AlissaR is a friend of friend (JuneJ) of the user TonyJ such that the user TonyJ and the end-user AlissaR have a second degree connection.

As a further example, the edges 219, 230, and 232 separate the node 202 from the node 214. Here, the nodes 212 and 206 separate the node 202 from the node 214. Therefore, end-user MacJ is a friend of a friend (KennedyJ) of a friend (TomJ) of the user TonyJ. Since three edges separate the user TonyJ from the end-user MacJ, the user TonyJ has a third degree connection with the end-user MacJ.

In some instances, multiple paths can exist between the nodes 202-218 in the social graph 200. For purposes of determining social distances, the shortest path of the multiple paths can be used. Still sticking with FIG. 2, the node 202 is separated from the node 216 by the edge 222. Moreover, the edges 220 and 224 separate the node 202 and the node 216. Here, the node 204 separates the nodes 202 and 216. As such, multiple paths between the nodes 202 and 216 exist. When a social distance is determined between the user TonyJ and the end-user JimB and the nodes 202 and 216, the shortest path can used. In this instance, the shortest path involves only the edge 222. Thus, the path associated with the edge 222 can be used for the social distance between the user TonyJ and the end-user JimB.

An edge in the social graph 200 can be removed, increased, or further separated at a later time. This can occur when two nodes, such as the nodes 212 and the node 206, can no longer be separated from the edge 230, such as if the user KennedyJ no longer maintains contact with the user TomJ. In this scenario, the social graph can be reconfigured to reflect the change in relationships among the users associated with the nodes in the social graph 200.

Figure 3A:
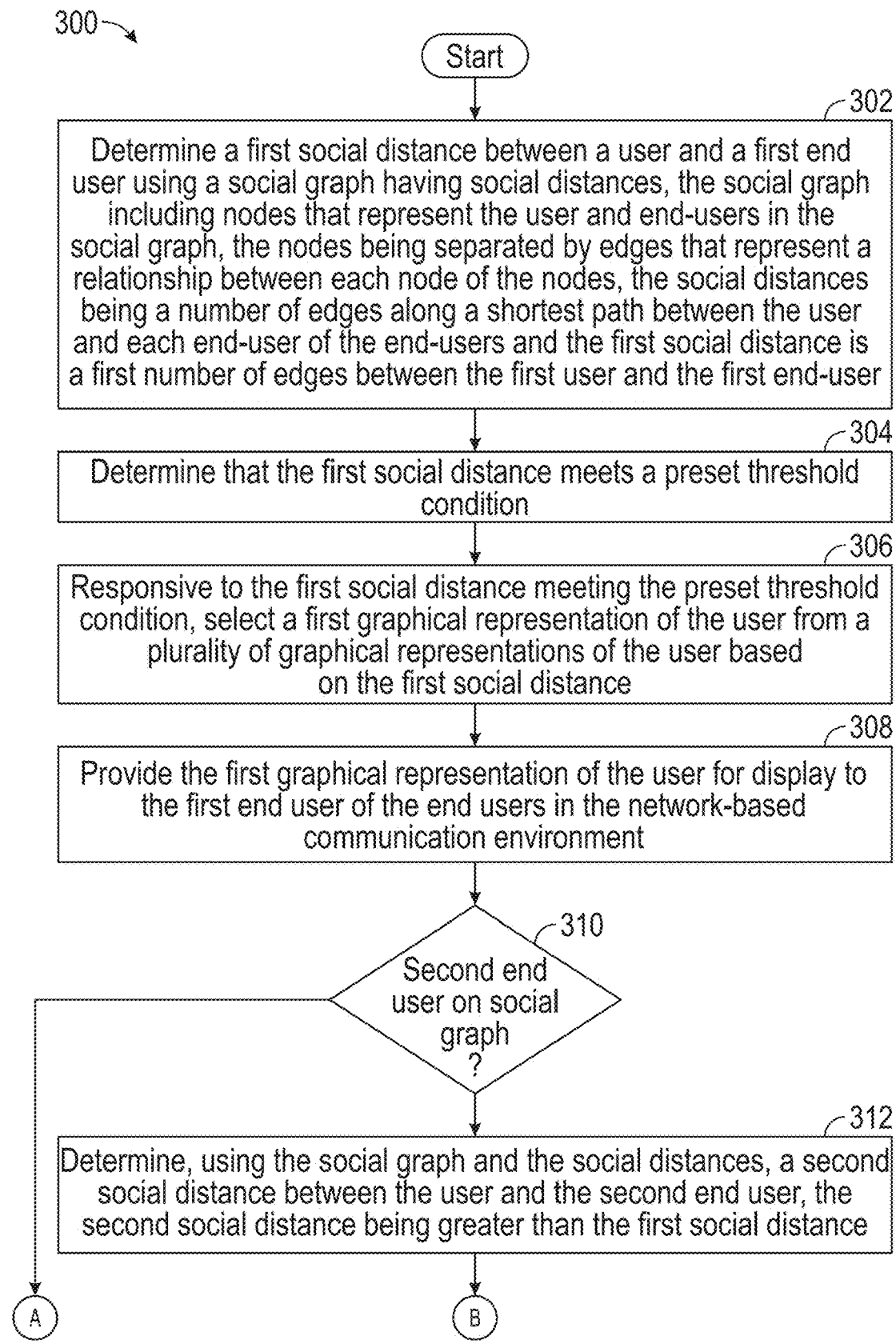
FIGS. 3A and 3B demonstrate a method for selectively creating different graphical representations of a user to display to a plurality of end users in a network-based communication environment based on a social graph, according to some examples of the present disclosure.
Figure 3B:
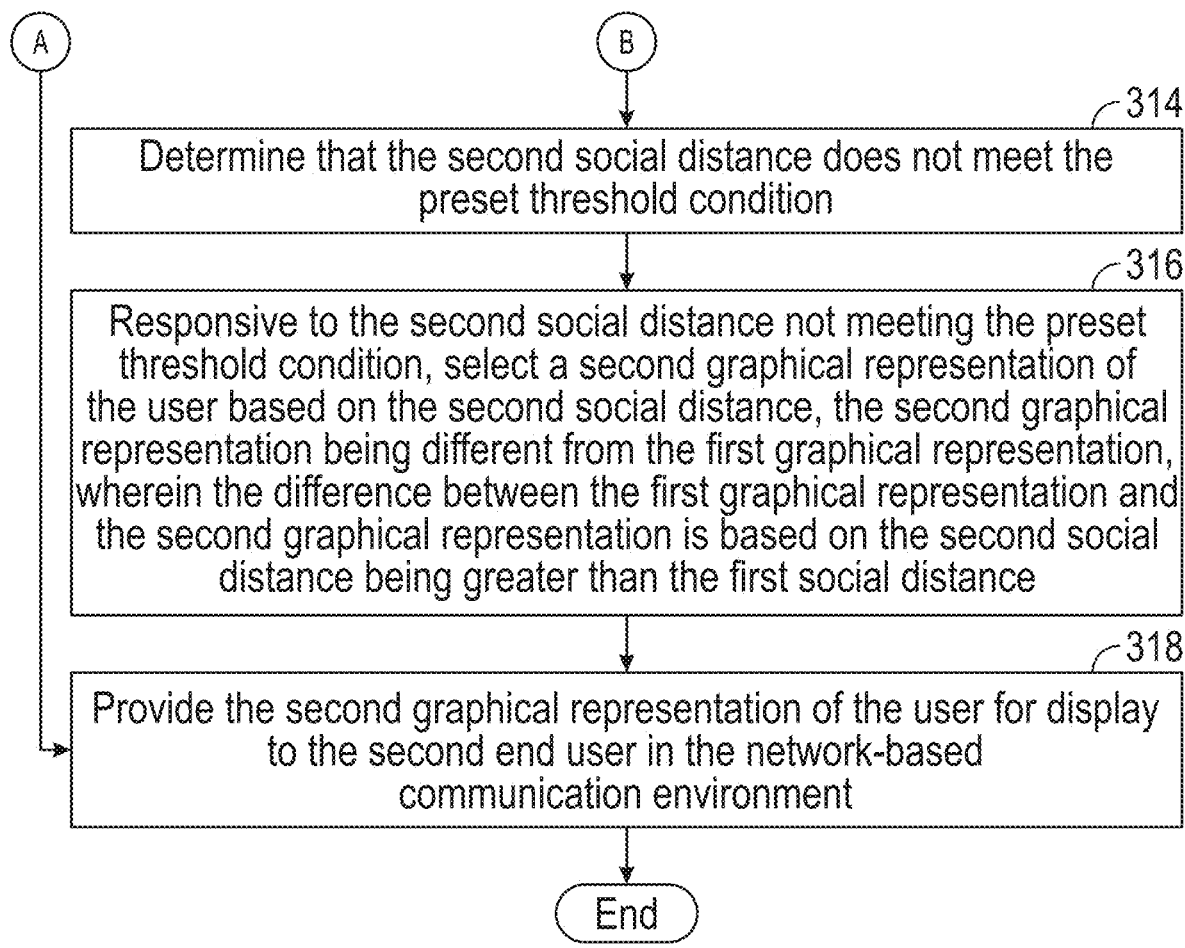

As noted above, examples relate to selectively creating different graphical representations of a user to display to end users in a network-based communication environment based on a social graph. FIG. 3 illustrates a method 300 to accomplish these features. Initially, during an operation 302, the method 300 determines a social distance between a user and a first end user using a social graph that has social distances. The social graph can include nodes that represent the user and end-users in the social graph where the nodes are separated by edges. The edges can represent a relationship between each node of the nodes. The social distances can correlate to a number of edges along a shortest path between the user and each end-user. Here, the first social distance can be a number of edges between the user and the first end-user.

Figure 2:
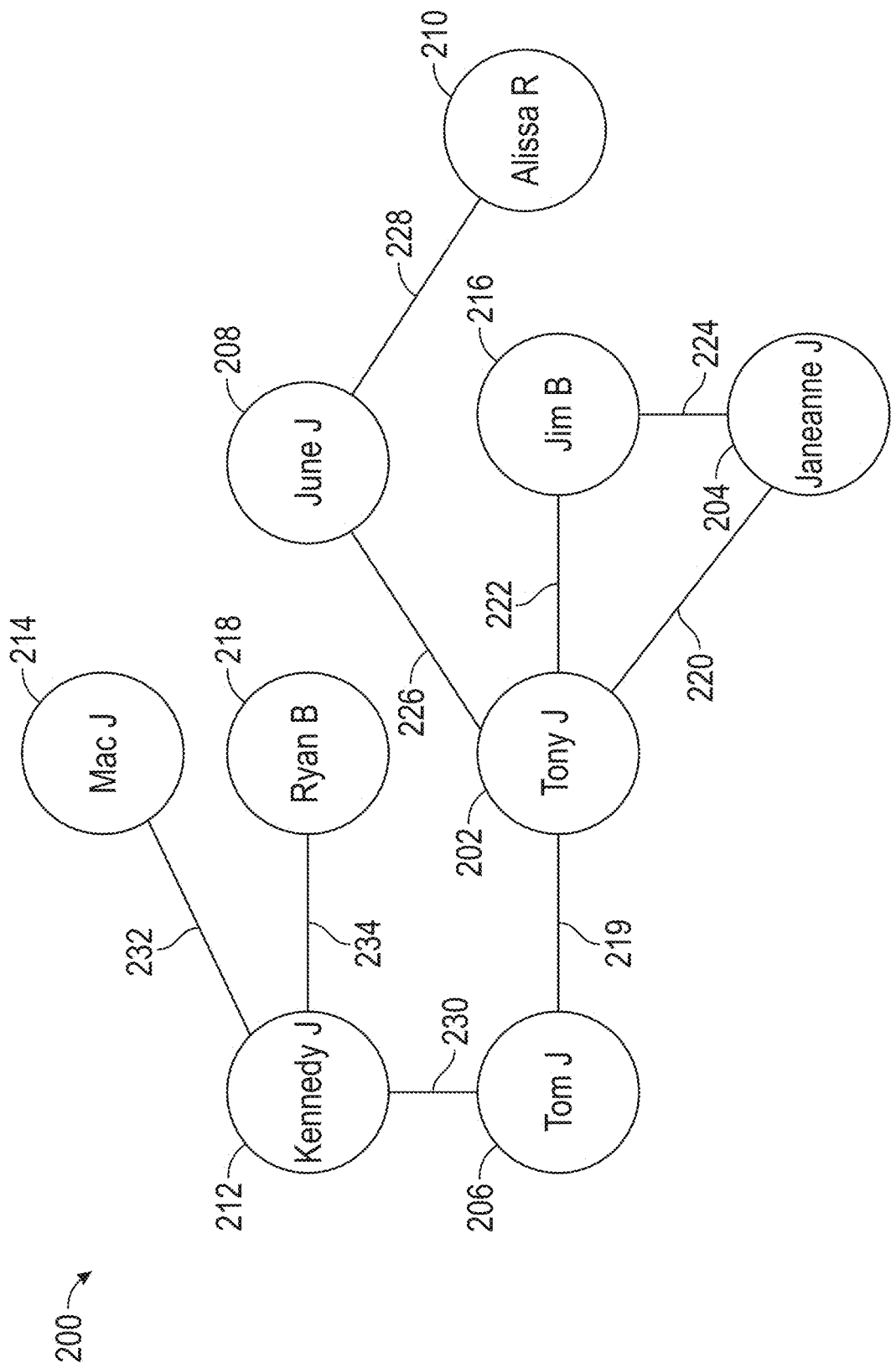
FIG. 2 illustrates a social graph that can be used by examples described herein, according to some examples of the present disclosure.
Figure 4:
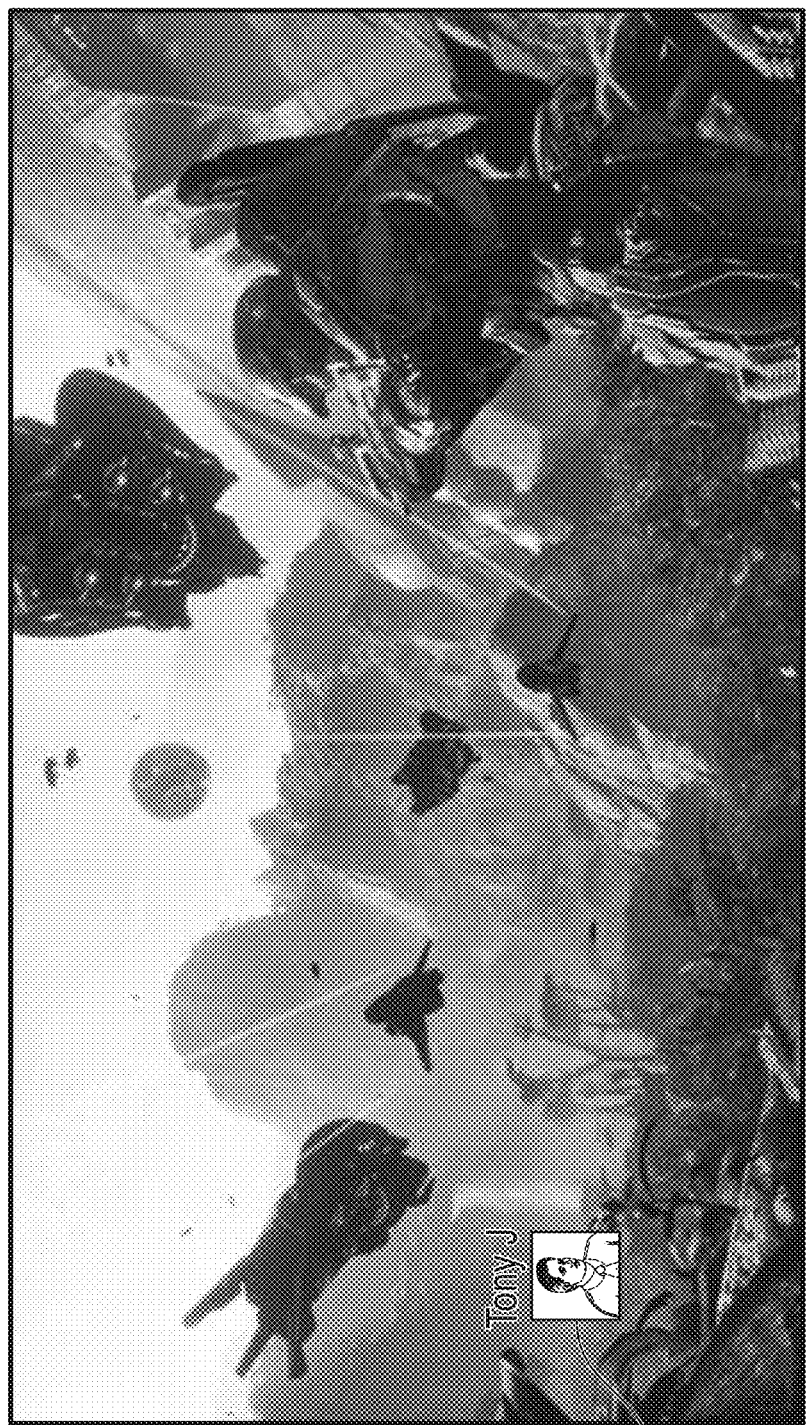
FIGS. 4 and 5 show a network-based communication environment within which examples can operate, according to some examples of the present disclosure.

As an example of the method 300 and referred to herein as "the first illustration," reference is now made to FIGS. 2 and 4. FIG. 4 shows a network-based communication environment 400 within which examples can operate generated by the multimedia-based application 112. The network-based communication environment 400 can be a gaming application where the multimedia-based application 112 operating on the devices 102 and 106A-D is rendering the network-based communication environment 400 as a gaming environment on each of the devices 102 and 106A-D. In the first illustration which is a game generated by the multimedia-based application 112, the network-based communication application 104 is Microsoft Teams™ where the multimedia-based application 112 is shared with the devices 102 and 106A-D via Microsoft Teams™. The network-based communication environment 400 can also be a live video feed environment.

During the operation 302, the network-based communication application 104 can determine that the user TonyJ and the end-user JaneanneJ are both in the network-based communication environment 400 based on indicia associated with each of the users TonyJ and JaneanneJ. The indicia can include an IP address that the device 102 associated with user TonyJ is using and an IP address that the device 106C associated with end-user JaneanneJ is using. Once the user TonyJ and the end-user JaneanneJ are identified, the network-based communication application 104 can map the user TonyJ and the end-user JaneanneJ to the social graph 200.

In the first illustration, the social graph 200 can be stored at the server device 110 and the network-based communication application 104 can access the social graph 200 at the server device 110. Alternatively, the social graph 200 can be remote to the server device 110 and the network-based communication application 104 can access the social graph 200 at the remote location. As shown in the social graph 200, the edge 220 separates the node 202 from the node 204. Moreover, the edges 222 and 224 separate the node 202 from the node 204. Since the edge 220 is the shortest path between the node 202 and the node 204, the edge 220 can be used to determine that the social distance between the node 202 and the node 204 is one.

Returning attention to FIG. 3 and the method 300, after the operation 302, an operation 304 can be performed where a determination is made regarding if the first social distance meets a preset threshold. The preset threshold can relate to how many edges exist between the user and the end-user. For example, the preset threshold can be the existence of a single edge between nodes, two edges between the nodes, three edges between the nodes, or any other number of edges between the nodes. Alternatively, as will be discussed further on, the social graph can relate to a contact list of the user where the preset threshold can relate to whether or not the end user is listed on the contact list of the user.

After performing the operation 304, the method 300 performs an operation 306 where a first graphical representation of the user is selected from a plurality of graphical representations of the user in response to determining that the first social distance meets the preset threshold condition. The first graphical representation can be selected based on the first social distance. Different graphical representations of the plurality of graphical representations can be selected based on different social distances.

In some instances, a first graphical representation can be a video image of the user. Thus, for the user TonyJ, the first graphical representation could be a photo or a video image of the user TonyJ. Furthermore, the photo or video image could include the head of the user or the head and torso of the user. In other instances, the first graphical representation can be a live video feed of the user. In particular, the device 106A associated with the user TonyJ could have a camera that captures a real-time video feed of the person associated with the user TonyJ. Eye gaze correction technology, such as Eye Contact available with Microsoft Teams™ from Microsoft™ Inc. located in Redmond Washington, can be used to render the first graphical representation.

A second graphical representation of the plurality of graphical representations can be a curated image. The curated image can be a computer generated graphical representation of the user, where either the network-based communication application 104 or the multimedia-based application 112 can select the image. Additionally, the user can provide an image to be used as the second graphical representation to the network-based communication application 104 or the multimedia-based application 112 for presentation. Examples of the second graphical representation can include an avatar that can be related to the network-based communication environment, such as a character in an online game or some other type of avatar. If the user has certain interests, such as a fan of a particular sports team, the second graphical representation can be an icon representation of the particular sports team.

In some scenarios, the closer an end-user is to a user on the social graph, the more realistic the image becomes. In examples, where a single edge separates the user and the end-user, the image could be a video or an image. For every additional edge that separates the user and the end-user, a different or more intense filter could be applied. To further illustrate, a blur filter with a zero blur value could be applied to first degree connections, a blur filter with 25% blur value to second degree, a blur filter with 50% for third degree, and so on. This blur values could be applied according to a ruleset. The ruleset can be user configurable.

Upon selecting the first graphical representation in the operation 306, the method 300 performs an operation 308. In the operation 308, the first graphical representation of the user is provided for display to the first end user of the plurality of end users in the network-based communication environment. The network-based communication application 104 can process a raw data feed that is used to render the network-based communication environment such that when the network-based communication environment is presented to the first end-user, the first graphical representation of the user will be shown in the network-based communication environment. The network-based communication application 104 can be configured to process metadata in the raw data feed by analyzing the raw data feed to determine features in the frames of the raw data feed. In a video game example, the features can include recognizing facial features in the raw data feed, mapping the recognized facial features to a data store, and, based on the mapping, determining that the facial features belong to a character in the video game associated with the user. Here, based on the selection made during the operation 306, the network-based communication application 104 can substitute the character with the first graphical representation during the operation 308.

Turning back to the first illustration and FIG. 2, the preset threshold can be a single edge and during the operation 304, the network-based communication application 104 determines that the first social distance is only the single edge 220 that separates the node 202 from the node 204. Thus, in the operation 304, the network-based communication application 104 determines that the first social distance meets the preset threshold condition of a single edge. In response to determining that the preset threshold is met, the network-based communication application 104 can select the first graphical representation of the user TonyJ during the operation 306. In the first illustration, the first graphical representation is a video image 116 of the user TonyJ. During the operation 308, the network-based communication application 104 can provide the video image 116 of the user TonyJ to the device 106C. As such, when the network-based communication environment 400 is displayed on the device 106C associated with the end-user JaneanneJ, the video image 116 of the user TonyJ will appear in the network-based communication environment 400, as shown with reference to FIG. 4.

Returning to FIG. 3, after the operation 308, an operation 310 is performed where a determination is made if a second end user is on the social graph. If a second end user is on the social graph, then an operation 312 is performed. Otherwise, the method 300 performs an operation 318. When a determination is made that a second end-user is on the social graph, an operation 312 is performed, where the method 300 determines a second social distance between the user and a second end user using the social graph and the social distances. Here, the second social distance can be greater than the first social distance. Once the second social distance is determined during the operation 312, the method 300 performs an operation 314, where a determination is made that the second social distance does not meet the preset threshold condition.

In response to determining that the second social distance does not meet the preset threshold condition, the method 300 performs an operation 316 where a second graphical representation of the user is selected from a plurality of graphical representations of the user. The second graphical representation can be different from the first graphical representation. The difference between the first graphical representation and the second graphical representation can be based on the second social distance being greater than the first social distance. In examples, the second graphical representation can be presented to the second end-user since the user may not have a direct connection with the second end-user. In particular, the second-end user may be a friend of a friend of the user. Thus, the user may not have a relationship with the second-end user aside from a nodal connection that is separated by multiple edges. Upon selecting the second graphical representation in the operation 316, the method 300 performs an operation 318. In the operation 318, the second graphical representation of the user is provided for display to the second end user of the plurality of end users in the network-based communication environment. The network-based communication application 104 can process the raw data feed that is used to render the network-based communication environment such that when the network-based communication environment is presented to the second end-user, the second graphical representation of the user will be shown in the network-based communication environment. Here, the network-based communication application 104 can process the same raw data feed in multiple ways to render multiple outputs. In particular, during the operation 308, the network-based communication application 104 processes the raw data feed to output a feed having the first graphical representation. Furthermore, during the operation 318, the network-based communication application 104 processes the same raw data feed to output a feed having the second graphical representation.

Figure 5:
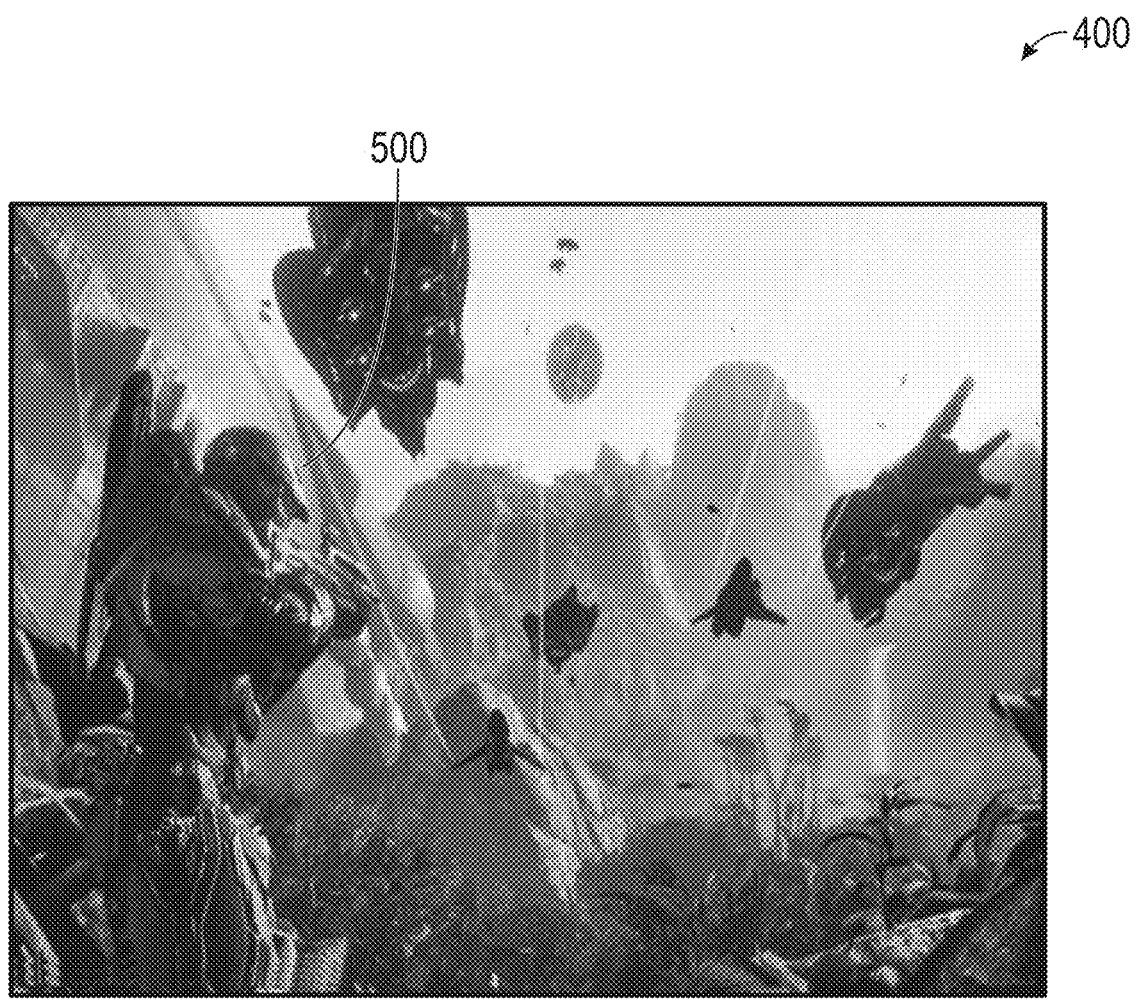

Turning back to the first illustration along with FIGS. 2 and 5, the second end-user can be the end-user KennedyJ. Thus, during the operation 310, the network-based communication application 104 accesses the social graph 200 and determines that the end-user KennedyJ is at the node 212 and therefore on the social graph 200. In response to determining that the end-user KennedyJ is on the social graph 200, the network-based communication application 104 performs the operation 312 where the network-based communication application 104 determines that the edges 219 and 230 separate the nodes 202 and 212. Accordingly, two edges separate the nodes 202 and 212, which, in the example, exceeds one edge and therefore does not meet the preset threshold condition of a single edge separating the nodes. In the first illustration, the user KennedyJ is a friend of the user TomJ, who is the brother of the user TonyJ and therefore a friend of a friend of TonyJ. In the first illustration, the preset threshold condition is one. Thus, during the operation 314, the network-based communication application 104 determines that the second social distance does not meet the preset threshold condition and selects a second graphical representation that correlates to an avatar 500 (FIG. 5) for the user TonyJ during the operation 316. During the operation 318, the network-based communication application 104 provides the avatar 500 of the user TonyJ to the device 106A associated with the end-user KennedyJ for display. As such, when the network-based communication environment 400 is displayed on the device 106A, the avatar of the user TonyJ will appear in the network-based communication environment 400, as shown with reference to FIG. 5.

As noted above, during the operation 310, the method 300 determines if a second end-user is on the social graph. In some instances, the second end-user may not have any type of relationship with the user. In particular, the second end-user may not be a friend of a friend. Thus, the second user may not appear on a social graph of the user, such as the social graph 200 associated with the user TonyJ. When a determination is made that the second end-user does not appear on a social graph associated with the user during the operation 310, the method performs the operation 318. Upon completion of the operation 318, the method 300 is complete.

Figure 6:
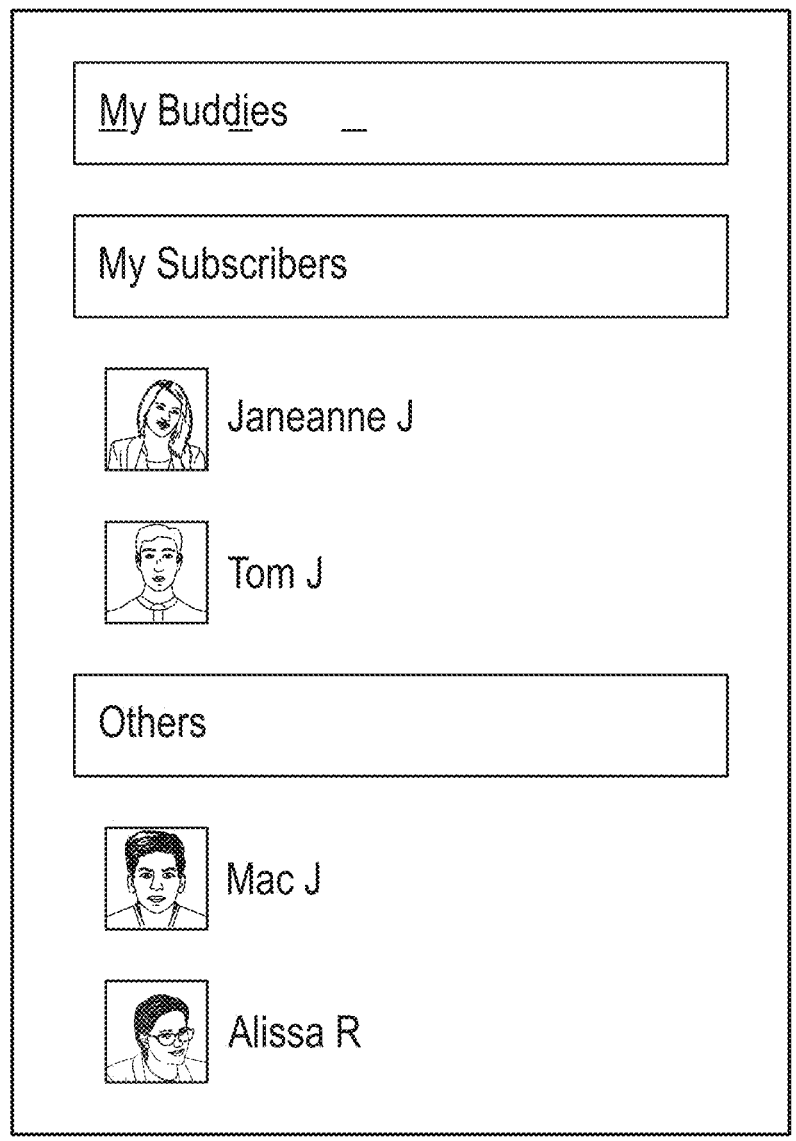
FIG. 6 illustrates a contact list that can be used by examples described herein, according to some examples of the present disclosure.
Figure 7:
FIG. 7 is a network-based communication environment within which examples can operate, according to some examples of the present disclosure.

In further examples, instead of the social graph 200, the social graph could pertain to a contact list, such as a contact list 600 associated with the user TonyJ, as shown with reference to FIG. 6. In examples, using the contact list 600, a first social distance between the user TonyJ and a first end-user can relate to the first end-user being listed on the contact list 600. The end users JaneanneJ, TomJ, MacJ, and AlissaR are listed in the contact list 600. The end users JimB and KennedyJ are not listed on the contact list 600. Thus, if the contact list is being used as the social graph, the end users JaneanneJ, TomJ, MacJ, and AlissaR have a first social distance and would be presented with the first graphical representation in a network-based communication environment as described above. Furthermore, the end users JimB and KennedyJ can have the second social distance since they are not listed on the contact list and would be presented with the second graphical representation in a network-based communication environment as described above.

In addition to rendering first and second graphical representations based on social distances in social graphs as discussed above, a third end-user can remit a resource credit, such as paying a fee, to view the network-based communication environment 400. Here, the third end-user can be a spectator that watches activities of the user, the first end-users, and the second end-users in the network-based communication environment but does not participate in the activities. To further illustrate, if the network-based communication environment is a gaming environment, the third end-users do not participate in the game and only watch the game. The third end-user who watches the activities will be referred to herein as a spectator. The spectators can remit payment, which can allow them to watch the network-based communication environment. When the spectator is provided with the network-based communication environment, the network-based communication environment includes a third graphical representation that is different from the first graphical representation and the second graphical representation. The third graphical representation can be different from the first graphical representation and the second graphical representation since the spectator has paid to be part of the network-based communication environment.

Returning to the first illustration, the network-based communication environment 400 relates to a gaming environment and a spectator can pay to watch the user TonyJ play the game with the permission of the user TonyJ. In the first illustration, the end-user MacJ can pay the user TonyJ to watch the network-based communication environment 400. In the first illustration, the network-based communication environment 400, which includes the video feed 700, can be presented on the device 106B associated with the end-user MacJ. Here, the video feed 700 can be different from the video image 116 and the avatar 500.

In the description above, the graphical representations were provided based on first and second social distances where a first graphical representation was provided based on the first social distance and the second graphical representation was provided based on second social distance. In some examples, multiple graphical representations can be presented based on multiple social distances. To further illustrate, and referred to herein as the "second illustration," the node 206 is separated from the node 202 by the edge 219, which can be the first social distance that is defined by a single edge. Based on the first social distance, in the second illustration, the end-user TomJ is provided with the video feed 700 in the network-based communication environment 400 on the device 106D.

In the second illustration, the node 218 is separated from the node 202 by the edges 219, 230, and 234. Here, the second social distance can be defined by three edges, the edges 219, 230, and 234. Based on the second social distance, in the second illustration, the end-user RyanB is presented with the avatar 500 in the network-based communication environment 400 that is presented on a device associated with the end-user RyanB. Moreover, in the second illustration, the user node 212 is separated from the node 202 by the edges 219 and 230. Here, the third social distance can be defined by two edges, the edges 219 and 230. Based on the third social distance, in the second illustration, the end-user KennedyJ is provided with the video image 116 in the network-based communication environment 400 on the device 106A. In the second illustration, since the third social distance was greater than the first social distance but less than the second social distance, the third graphical representation, i.e., the video image 116, is a closer approximation of the user TonyJ in comparison to the second graphical representation. Furthermore, since the first social distance is the closest social distance, the end-user TomJ is provided with an approximation that is even closer to the user TonyJ, the video feed 700 in comparison to the second graphical representation and the third graphical representation.

In the examples and illustrations above, the network-based communication environment 400 displayed on the devices 106 were described with reference to social distances in relation to the user TonyJ. In further examples, the network-based communication environment 400 displayed on the devices 106 can be customized based on the user associated with the respective device 106 and the social graph 200. For example, the end-user TomJ has a social distance of one edge, the edge 230, from the end-user KennedyJ and has a social distance of one edge, the edge 219, from the user TonyJ. Therefore, the network-based communication environment 400 can look different on the device 106D associated with the end-user TomJ in comparison with the network-based communication environment 400 provided on the device 102. Since the end-user KennedyJ has a social distance of two edges, the edges 219 and 230, from the user TonyJ, a graphical representation of the user KennedyJ will look different on the network-based communication environment 400 provided on the user device 102 associated with user TonyJ in comparison to the graphical representation of the user KennedyJ on the network-based communication environment 400 provided on the user device 106D. More specifically, a second graphical representation of the end-user KennedyJ can be provided with the network-based communication environment 400 on the user device 102 while a first graphical representation of the end-user KennedyJ different from the second graphical representation will be provided on the user device 106D based on the different social distances.

In the examples and illustrations above, the network-based communication application 104 can use either the social graph 200 or the contact list 600 to determine which graphical representations different end-users should be presented with. In further examples, a user, such as the user TonyJ, can establish rules that can be used to determine which end-users are provided with which graphical representations. For example, the user TonyJ can specify that the end-users TomJ, AlissaR, and MacJ are provided with a first graphical representation having the characteristics described above, while the end-users JaneanneJ and JimB are provided with the second graphical representation having the characteristics described above. Thus, graphical representations can be provided based on rules established by the user.

In accordance with examples, a social distance can be used to dictate where on a display device associated with an end-user a graphical representation of a user can be presented. To further illustrate, if there is one edge separating nodes associated with a user and an end-user, a graphical representation for the user can appear in a northwest quadrant of a display device associated with the end-user. Moreover, if there are two edges separating nodes associated with a user and an end-user, a graphical representation for the user can appear in a southeast quadrant of a display device associated with the end-user.

Figure 8:
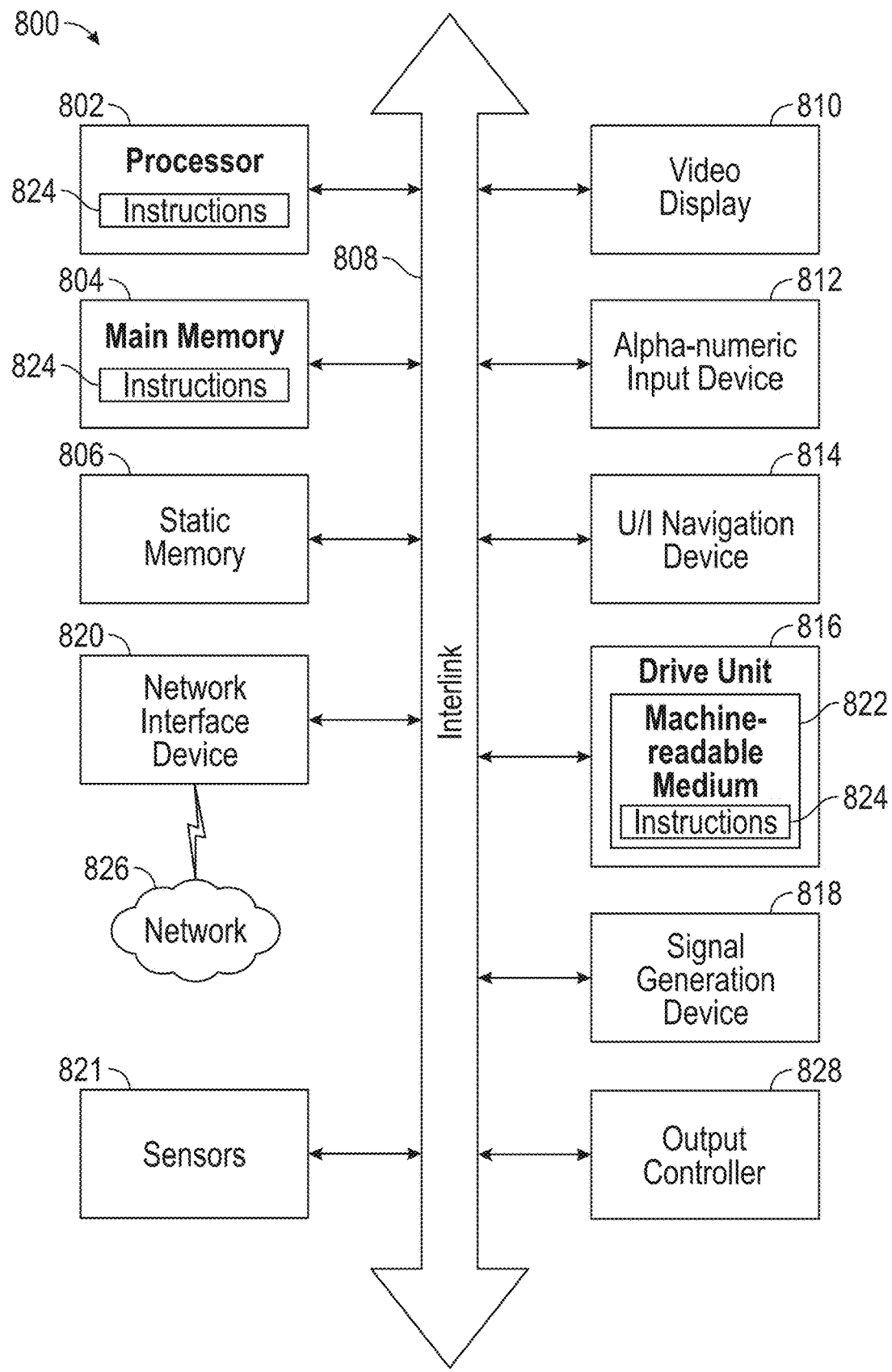
FIG. 8 is a block diagram illustrating an example of a machine upon which one or more examples may be implemented.
Figure 9:
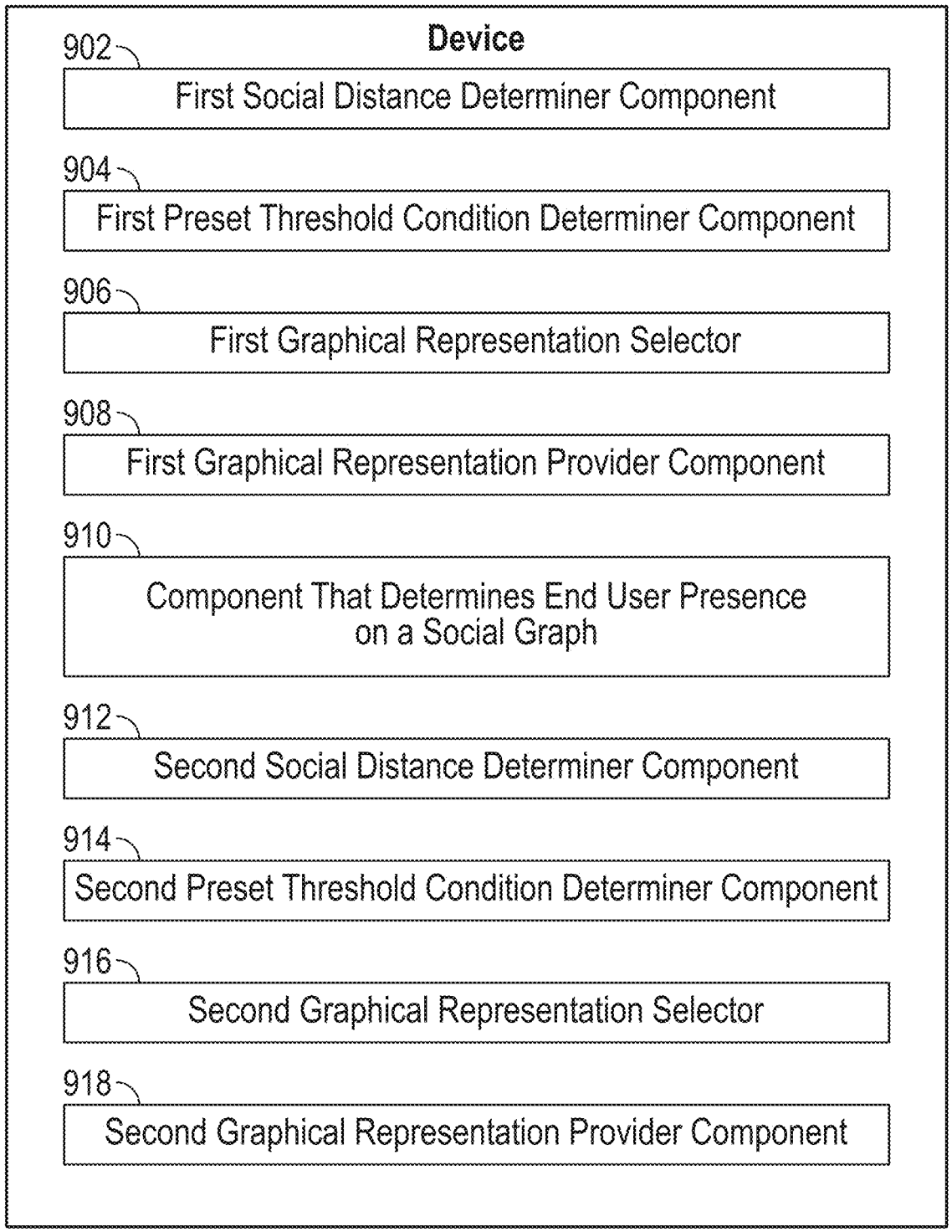
FIG. 9 illustrates a device that can be used to implement exemplary examples of the present disclosure.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 800 may be configured to provide the functionality of the various devices described with reference to FIG. 1; determine if an end-user is on a social graph associated with a user; determine first and second social distances as described above; determine if the first and second distances meet a preset threshold condition; select first and second graphical representations as described above; and provide first and second graphical representations to devices, also as described above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

In addition, examples can include a device 900 having components to achieve the features disclosed herein. The device 900 may be an example configuration of machine 800—e.g., through hardware or software. For example, the device 900 can include a first social distance determiner component 902 that can determine a first social distance between a user and a first end user of a plurality of end users. The device 900 can also have a first preset threshold condition determiner component 904 that can determine of a first social distance meets a preset threshold condition.

The device 900 can also include a first graphical representation selector 906 that can select a first graphical representation of a user from a plurality of graphical representations of the user based on a first social distance. The selection can be made in response to determining that a first social distance meets a preset threshold condition. Furthermore, the device 900 can have a component 908 that can provide the first graphical representation for display to the first end-user.

Moreover, the device 900 can have a component 910 that can determine if a second end-user of the plurality of end-users is on a social graph. In addition to the component 910, the device 900 can include a second social distance determiner component 912 that can determine a second social distance between a user and a second end user of a plurality of end users. The device 900 can also have a second preset threshold condition determiner component 914 that can determine of a second social distance meets the preset threshold condition.

The device 900 can also include a second graphical representation selector 916 that can select a second graphical representation of the user from the plurality of graphical representations of the user based on a second social distance. The second graphical representation can be different from the first graphical representation and can be selected based on the second social distance. In examples, the difference can be based on the second social distance being greater than the first social distance. Furthermore, the device 900 can have a component 918 that can provide the second graphical representation for display to the second end-user.

Other Notes and Examples

Example 1 is a method for selectively creating different graphical representations of a user to display to a plurality of end users in a network-based communication environment based on a social graph, the social graph having a plurality of social distances between the user and the plurality of end users, the method comprising: determining a first social distance between the user and a first end user of the plurality of end users using the social graph and the plurality of social distances, wherein the social graph includes, a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users and the first social distance is a first number of edges between a user node in the plurality of nodes that represents the user and a first user node in the plurality of nodes that represents the first user; determining that the first social distance meets a preset threshold condition; responsive to the first social distance meeting the preset threshold condition, selecting a first graphical representation of the user from a plurality of graphical representations of the user based on the first social distance; providing the first graphical representation of the user for display to the first end user of the plurality of end users in the network-based communication environment; determining, with the social graph and the plurality of social distances, if a second end user of the plurality of end users is on the social graph; when the second user is on the social graph, determining, with the social graph and the plurality of social distances, a second social distance between the user and the second end user of the plurality of end users, the second social distance being greater than the first social distance; determining that the second social distance does not meet the preset threshold condition; responsive to the second social distance not meeting the preset threshold condition or determining that the second end user is not on the social graph, selecting a second graphical representation of the user based on the second social distance, the second graphical representation being different from the first graphical representation, wherein the difference between the first graphical representation and the second graphical representation is based on the second social distance being greater than the first social distance when the second end user is on the social graph; and providing the second graphical representation of the user for display to the second end user of the plurality of end users in the network-based communication environment.

In Example 2, the subject matter of Example 1 includes, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

In Example 3, the subject matter of Examples 1-2 includes, wherein the greater the number of edges between a first node associated with the user and a second node associated with one end-user of the plurality of end-users, the greater the social distance between the user and the one end-user of the plurality of end-users.

In Example 4, the subject matter of Examples 1-3 includes, wherein the first graphical representation is one of a photo of the user or a video feed of the user and the second graphical representation is an avatar of the user.

In Example 5, the subject matter of Examples 1-4 includes, the method further comprising: determining that a third end-user of the plurality of end users has a resource credit; selecting a third graphical representation of the user based on the resource credit, the third graphical representation being different from the first graphical representation and the second graphical representation, wherein the differences between the first graphical representation, the second graphical representation, and the third graphical representation are based on the difference between the first social distance and the second social distance and the resource credit; and providing the third graphical representation of the user for display to the third end-user of the plurality of end users in the online environment.

In Example 6, the subject matter of Examples 1-5 includes, the method further comprising: determining, with the social graph and the plurality of social distances, a third social distance between the user and a third end user of the plurality of end users, the third social distance being greater than the first social distance and less than the second social distance; selecting a third graphical representation of the user based on the third social distance, the third graphical representation being different from the first graphical representation and the second graphical representation; and providing the third graphical representation of the user for display to the third end user of the plurality of end users in the network-based communication environment.

In Example 7, the subject matter of Examples 1-6 includes, wherein the network-based communication environment in one of a gaming environment, a virtual meeting, electronic mail, or a messaging application.

Example 8 is a computing device for selectively creating different graphical representations of a user to display to a plurality of end users in a network-based communication environment based on a social graph, the social graph having a plurality of social distances between the user and the plurality of end users, the computing device comprising: a processor; a memory, storing instructions, which when executed by the processor cause the computing device to perform operations comprising: determining a first social distance between the user and a first end user of the plurality of end users using the social graph and the plurality of social distances, wherein the social graph includes, a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users and the first social distance is a first number of edges between a user node in the plurality of nodes that represents the user and a first user node in the plurality of nodes that represents the first user; determining that the first social distance meets a preset threshold condition; responsive to the first social distance meeting the preset threshold condition, selecting a first graphical representation of the user from a plurality of graphical representations of the user based on the first social distance; providing the first graphical representation of the user for display to the first end user of the plurality of end users in the network-based communication environment; determining, with the social graph and the plurality of social distances, a second social distance between the user and a second end user of the plurality of end users, the second social distance being greater than the first social distance; determining that the second social distance does not meet the preset threshold condition; responsive to the second social distance not meeting the preset threshold condition, selecting a second graphical representation of the user based on the second social distance, the second graphical representation being different from the first graphical representation, wherein the difference between the first graphical representation and the second graphical representation is based on the second social distance being greater than the first social distance; and providing the second graphical representation of the user for display to the second end user of the plurality of end users in the network-based communication environment.

In Example 9, the subject matter of Example 8 includes, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

In Example 10, the subject matter of Examples 8-9 includes, wherein the greater the number of edges between a first node associated with the user and a second node associated with one end-user of the plurality of end-users, the greater the social distance between the user and the one end-user of the plurality of end-users.

In Example 11, the subject matter of Examples 8-10 includes, wherein the operations further comprise: determining that a third end-user of the plurality of end users has a resource credit; selecting a third graphical representation of the user based on the resource credit, the third graphical representation being different from the first graphical representation and the second graphical representation, wherein the differences between the first graphical representation, the second graphical representation, and the third graphical representation are based on the difference between the first social distance and the second social distance and the resource credit; and providing the third graphical representation of the user for display to the third end-user of the plurality of end users in the online environment.

In Example 12, the subject matter of Examples 8-11 includes, wherein the operations further comprise: determining, with the social graph and the plurality of social distances, a third social distance between the user and a third end user of the plurality of end users, the third social distance being greater than the first social distance and less than the second social distance; selecting a third graphical representation of the user based on the third social distance, the third graphical representation being different from the first graphical representation and the second graphical representation; and providing the third graphical representation of the user for display to the third end user of the plurality of end users in the network-based communication environment.

In Example 13, the subject matter of Examples 8-12 includes, wherein the first graphical representation is one of a photo of the user or a video feed of the user and the second graphical representation is an avatar of the user.

In Example 14, the subject matter of Examples 8-13 includes, wherein the network-based communication environment in one of a gaming environment, a virtual meeting, electronic mail, or a messaging application.

Example 15 is a device for selectively creating different graphical representations of a user to display to a plurality of end users in a network-based communication environment based on a social graph, the social graph having a plurality of social distances between the user and the plurality of end users, the device comprising: means for determining a first social distance between the user and a first end user of the plurality of end users using the social graph and the plurality of social distances, wherein the social graph includes, a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users, and the first social distance is a first number of edges between a user node in the plurality of nodes that represents the user and a first user node in the plurality of nodes that represents the first user; means for determining that the first social distance meets a preset threshold condition; responsive to the first social distance meeting the preset threshold condition, means for selecting a first graphical representation of the user from a plurality of graphical representations of the user based on the first social distance; means for providing the first graphical representation of the user for display to the first end user of the plurality of end users in the network-based communication environment; means for determining, with the social graph and the plurality of social distances, a second social distance between the user and a second end user of the plurality of end users, the second social distance being greater than the first social distance; means for determining that the second social distance does not meet the preset threshold condition; responsive to the second social distance not meeting the preset threshold condition, means for selecting a second graphical representation of the user based on the second social distance, the second graphical representation being different from the first graphical representation, wherein the difference between the first graphical representation and the second graphical representation is based on the second social distance being greater than the first social distance; and means for providing the second graphical representation of the user for display to the second end user of the plurality of end users in the network-based communication environment.

In Example 16, the subject matter of Example 15 includes, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

In Example 17, the subject matter of Examples 15-16 includes, wherein the greater the number of edges between a first node associated with the user and a second node associated with one end-user of the plurality of end-users, the greater the social distance between the user and the one end-user of the plurality of end-users.

In Example 18, the subject matter of Examples 15-17 includes, the device further comprising: means for determining that a third end-user of the plurality of end users has a resource credit; means for selecting a third graphical representation of the user based on the resource credit, the third graphical representation being different from the first graphical representation and the second graphical representation, wherein the differences between the first graphical representation, the second graphical representation, and the third graphical representation are based on the difference between the first social distance and the second social distance and the resource credit; and means for providing the third graphical representation of the user for display to the third end-user of the plurality of end users in the online environment.

In Example 19, the subject matter of Examples 15-18 includes, the device further comprising: means for determining, with the social graph and the plurality of social distances, a third social distance between the user and a third end user of the plurality of end users, the third social distance being greater than the first social distance and less than the second social distance; means for selecting a third graphical representation of the user based on the third social distance, the third graphical representation being different from the first graphical representation and the second graphical representation; and means for providing the third graphical representation of the user for display to the third end user of the plurality of end users in the network-based communication environment.

In Example 20, the subject matter of Examples 15-19 includes, wherein the first graphical representation is one of a photo of the user or a video feed of the user and the second graphical representation is an avatar of the user.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method for selectively creating different graphical representations of a user to display to a plurality of end users in a network-based communication environment based on a social graph, the social graph having a plurality of social distances between the user and the plurality of end users, the method comprising:
   determining a first social distance between the user and a first end user of the plurality of end users based upon the social graph and the plurality of social distances, wherein the social graph includes a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users, and the first social distance is a first number of edges between a user node in the plurality of nodes that represents the user and a first user node in the plurality of nodes that represents the first end user;

determining that the first social distance meets a preset threshold condition;

responsive to the first social distance meeting the preset threshold condition, selecting a first graphical representation of the user from a plurality of graphical representations of the user based on the first social distance;

providing the first graphical representation of the user for display to the first end user of the plurality of end users in the network-based communication environment;

responsive to a second social distance of a second end user not meeting the preset threshold condition or responsive to determining that the second end user is not on the social graph, selecting a second graphical representation of the user, the second graphical representation being different from the first graphical representation, wherein the difference between the first graphical representation and the second graphical representation is based on the second social distance being greater than the first social distance or based upon the second end user not being on the social graph; and providing the second graphical representation of the user for display to the second end user of the plurality of end users in the network-based communication environment.

2. The method of claim 1, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

3. The method of claim 1, wherein a greater the number of edges between a first node associated with the user and a second node associated with one end-user of the plurality of end-users, a greater a social distance between the user and the one end-user of the plurality of end-users.

4. The method of claim 1, wherein the first graphical representation is one of a photo of the user or a video feed of the user and the second graphical representation is an avatar of the user.

5. The method of claim 1, the method further comprising:
determining that a third end-user of the plurality of end users has a resource credit;
selecting a third graphical representation of the user based on the resource credit, the third graphical representation being different from the first graphical representation and the second graphical representation, wherein differences between the first graphical representation, the second graphical representation, and the third graphical representation are based on a difference between the first social distance and the second social distance and the resource credit; and
providing the third graphical representation of the user for display to the third end-user of the plurality of end users in an online environment.

6. The method of claim 1, the method further comprising:
determining, with the social graph and the plurality of social distances, a third social distance between the user and a third end user of the plurality of end users, the third social distance being greater than the first social distance and less than the second social distance;
selecting a third graphical representation of the user based on the third social distance, the third graphical representation being different from the first graphical representation and the second graphical representation; and
providing the third graphical representation of the user for display to the third end user of the plurality of end users in the network-based communication environment.

7. The method of claim 1, wherein the network-based communication environment in one of a gaming environment, a virtual meeting, electronic mail, or a messaging application.

8. A computing device for selectively creating different graphical representations of a user to display to a plurality of end users in a network-based communication environment based on a social graph, the social graph having a plurality of social distances between the user and the plurality of end users, the computing device comprising:
a processor;
a memory, storing instructions, which when executed by the processor cause the computing device to perform operations comprising:
determining a first social distance between the user and a first end user of the plurality of end users based upon the social graph and the plurality of social distances, wherein the social graph includes a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users and the first social distance is a first number of edges between a user node in the plurality of nodes that represents the user and a first user node in the plurality of nodes that represents the first end user;
determining that the first social distance meets a preset threshold condition;
responsive to the first social distance meeting the preset threshold condition, selecting a first graphical representation of the user from a plurality of graphical representations of the user based on the first social distance;
providing the first graphical representation of the user for display to the first end user of the plurality of end users in the network-based communication environment;
responsive to a second social distance of a second end user not meeting the preset threshold condition or responsive to determining that the second end user is not on the social graph, selecting a second graphical representation of the user, the second graphical representation being different from the first graphical representation, wherein the difference between the first graphical representation and the second graphical representation is based on the second social distance being greater than the first social distance or based upon the second end user not being on the social graph; and
providing the second graphical representation of the user for display to the second end user of the plurality of end users in the network-based communication environment.

9. The computing device of claim 8, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

10. The computing device of claim 8, wherein a greater the number of edges between a first node associated with the user and a second node associated with one end-user of the plurality of end-users, a greater a social distance between the user and the one end-user of the plurality of end-users.

11. The computing device of claim 8, wherein the operations further comprise:
 determining that a third end-user of the plurality of end users has a resource credit;
 selecting a third graphical representation of the user based on the resource credit, the third graphical representation being different from the first graphical representation and the second graphical representation, wherein differences between the first graphical representation, the second graphical representation, and the third graphical representation are based on a difference between the first social distance and the second social distance and the resource credit; and
 providing the third graphical representation of the user for display to the third end-user of the plurality of end users in an online environment.

12. The computing device of claim 8, wherein the operations further comprise:
 determining, with the social graph and the plurality of social distances, a third social distance between the user and a third end user of the plurality of end users, the third social distance being greater than the first social distance and less than the second social distance;
 selecting a third graphical representation of the user based on the third social distance, the third graphical representation being different from the first graphical representation and the second graphical representation; and
 providing the third graphical representation of the user for display to the third end-user of the plurality of end users in the network-based communication environment.

13. The computing device of claim 8, wherein the first graphical representation is one of a photo of the user or a video feed of the user and the second graphical representation is an avatar of the user.

14. The computing device of claim 8, wherein the network-based communication environment in one of a gaming environment, a virtual meeting, electronic mail, or a messaging application.

15. A device for selectively creating different graphical representations of a user to display to a plurality of end users in a network-based communication environment based on a social graph, the social graph having a plurality of social distances between the user and the plurality of end users, the device comprising:
 means for determining a first social distance between the user and a first end user of the plurality of end users based upon the social graph and the plurality of social distances, wherein the social graph includes a plurality of nodes that represent the user and each of the plurality of end-users, the plurality of nodes being separated by a plurality of edges that represent a relationship between each node of the plurality nodes, the plurality of social distances being a number of edges along a shortest path between the user and each end-user of the plurality of end-users and the first social distance is a first number of edges between a user node in the plurality of nodes that represents the user and a first user node in the plurality of nodes that represents the first end user;
 means for determining that the first social distance meets a preset threshold condition;
 responsive to the first social distance meeting the preset threshold condition, means for selecting a first graphical representation of the user from a plurality of graphical representations of the user based on the first social distance;
 means for providing the first graphical representation of the user for display to the first end user of the plurality of end users in the network-based communication environment;
 responsive to a second social distance of a second end user not meeting the preset threshold condition or responsive to determining that the second end user is not on the social graph, means for selecting a second graphical representation of the user, the second graphical representation being different from the first graphical representation, wherein the difference between the first graphical representation and the second graphical representation is based on the second social distance being greater than the first social distance or based upon the second end user not being on the social graph; and
 means for providing the second graphical representation of the user for display to the second end user of the plurality of end users in the network-based communication environment.

16. The device of claim 15, wherein the social graph is created based on a contact list associated with the user and the first and second social distances relate to the plurality of end-users being listed on the contact list, the first end user of the plurality of end users being listed on the contact list and the second end user of the plurality of end users not being listed on the contact list, wherein the first graphical representation is a live video feed of the user and the second graphical representation is an avatar.

17. The device of claim 15 wherein a greater the number of edges between a first node associated with the user and a second node associated with one end-user of the plurality of end-users, a greater a social distance between the user and the one end-user of the plurality of end-users.

18. The device of claim 15, the device further comprising:
 means for determining that a third end-user of the plurality of end users has a resource credit;
 means for selecting a third graphical representation of the user based on the resource credit, the third graphical representation being different from the first graphical representation and the second graphical representation, wherein differences between the first graphical representation, the second graphical representation, and the third graphical representation are based on a difference between the first social distance and the second social distance and the resource credit; and
 means for providing the third graphical representation of the user for display to the third end-user of the plurality of end users in an online environment.

19. The device of claim 15, the device further comprising:
 means for determining, with the social graph and the plurality of social distances, a third social distance between the user and a third end user of the plurality of end users, the third social distance being greater than the first social distance and less than the second social distance;
 means for selecting a third graphical representation of the user based on the third social distance, the third graphical representation being different from the first graphical representation and the second graphical representation; and means for providing the third graphical representation of the user for display to the third end user of the plurality of end users in the network-based communication environment.

20. The device of claim 15, wherein the first graphical representation is one of a photo of the user or a video feed of the user and the second graphical representation is an avatar of the user.

* * * * *